United States Patent
Beckmann et al.

(10) Patent No.: US 8,081,587 B2
(45) Date of Patent: Dec. 20, 2011

(54) METHOD, SUBSCRIBER DEVICE AND RADIO COMMUNICATION SYSTEM FOR TRANSMITTING USER DATA MESSAGES

(75) Inventors: Mark Beckmann, Braunschweig (DE); Michael Eckert, Braunschweig (DE); Martin Hans, Hildesheim (DE); Andreas Otte, Celle (DE)

(73) Assignee: Siemens Aktiengesellschaft, Munich (DE)

( * ) Notice: Subject to any disclaimer, the term of this patent is extended or adjusted under 35 U.S.C. 154(b) by 362 days.

(21) Appl. No.: 10/523,065

(22) PCT Filed: Jul. 15, 2003

(86) PCT No.: PCT/DE03/02381
§ 371 (c)(1),
(2), (4) Date: Sep. 8, 2005

(87) PCT Pub. No.: WO2004/017649
PCT Pub. Date: Feb. 26, 2004

(65) Prior Publication Data
US 2006/0094441 A1 May 4, 2006
US 2011/0003600 A2 Jan. 6, 2011

(30) Foreign Application Priority Data

Aug. 2, 2002 (DE) .................................. 102 35 470

(51) Int. Cl.
*H04B 7/00* (2006.01)
(52) U.S. Cl. ........ 370/310; 370/278; 370/349; 370/348; 370/338
(58) Field of Classification Search .................. 370/310, 370/278, 349, 348, 338, 312
See application file for complete search history.

(56) References Cited

U.S. PATENT DOCUMENTS
6,684,081 B2 * 1/2004 Sarkkinen et al. ............ 455/515
(Continued)

FOREIGN PATENT DOCUMENTS
EP          0 944 275          9/1999
(Continued)

OTHER PUBLICATIONS
3GPP TR 25.925 (Mar. 2001) $3^{rd}$ Generation Partnership Project; Technical Specification Group Radio Access Network; Radio Interface for broadcast/multicast services (Release 1999) pp. 1-31.
(Continued)

*Primary Examiner* — Kamran Afshar
*Assistant Examiner* — Sayed T Zewari
(74) *Attorney, Agent, or Firm* — King & Spalding L.L.P.

(57) ABSTRACT

A method is provided for transmitting user data messages from a network element of a radio communication system via at least one transmission channel to at least one subscriber terminal of the radio communication system, whereby the form of the user data messages is announced before the transmission thereof via planning information. The planning information includes a first planning message by which the transmission of the user data messages is announced via a first separate transmission channel, and a second planning message by which description information is transmitted via at least one second transmission channel, the description information indicating the form of the user data messages to be transmitted. The form of the user data messages to be transmitted can include the data type and/or the codification of the user data messages. Announcing the form of the user data messages in the planning information enables the subscriber terminal to only intercept or receive the user data messages that it can actually process, thus enabling energy to be saved during reception and processing.

17 Claims, 3 Drawing Sheets

U.S. PATENT DOCUMENTS 6,771,639 B1 * 8/2004 Holden .................. 370/352
2002/0057663 A1 * 5/2002 Lim .................... 370/338

FOREIGN PATENT DOCUMENTS

| | | |
|---|---|---|
| EP | 1 353 523 | 10/2003 |
| JP | 11331070 | 11/1999 |
| JP | 2001202369 | 7/2001 |
| WO | WO 00/72609 | 11/2000 |

OTHER PUBLICATIONS

3GPP TS 25.324 V.3.4.0 (Mar. 2001) $3^{rd}$ Generation Partnership Project; Technical Specification Group Radio Access Network; Broadcast/Multicast Control BMC (Release 1999) pp. 1-23.

XP-002191629—"$3^{rd}$ Generation Partnership Project: Technical Specification Group Radio Access Network; Radio Interface for Broadcast/Multicast Services (Release 1999)" Mar. 2001.

* cited by examiner

FIG 3

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
|   |   | CTCH | CTCH |   |   |   |   | CTCH | CTCH |    |    |    |    | CTCH | CTCH |    |    |

FIG 4

| Frame numbers | CFCH resource index |
|---|---|
| 2,3 | 1 |
| 8,9 | 2 |
| 14,15 | 3 |
| 20,21 | 4 |
| 26,27 | 5 |
| 32,33 | 6 |
| ... | ... |

FIG 5  BMC planning message
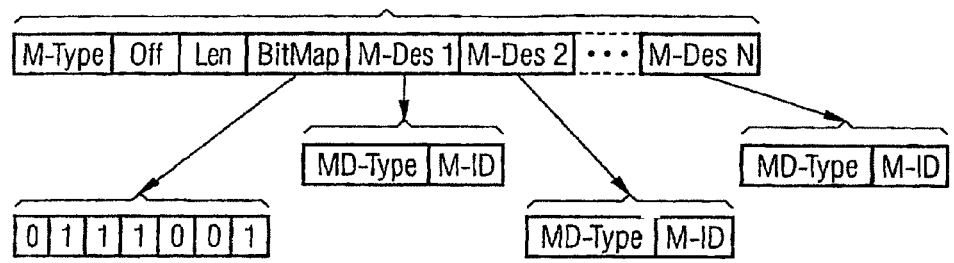
FIG 6  BMC planning message
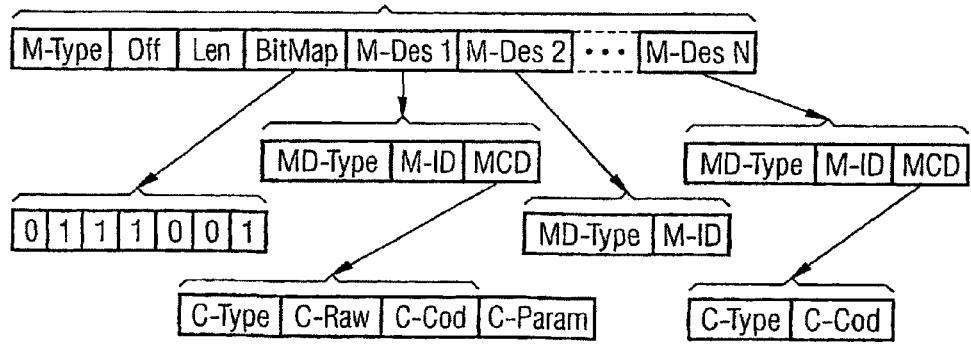

METHOD, SUBSCRIBER DEVICE AND RADIO COMMUNICATION SYSTEM FOR TRANSMITTING USER DATA MESSAGES

BACKGROUND OF THE INVENTION

The present invention relates to a method for transmitting user data messages, from a sender to one or more recipients, a subscriber device and a radio communication system.

In the case of many services and applications which are offered in modem mobile radio systems, messages must be transmitted to not just one subscriber, but to two or more subscribers. Such services and applications include, for example, news groups, video conferences, video on demand, distributed applications, etc.

When transmitting the messages to the different subscribers, it is possible to send a copy of the data to each recipient separately. Although this technique is easy to implement, it is unsuitable for large groups. Because the same message is transmitted over N individual connections or unicast connections (N corresponds to the number of recipients) and is therefore sent multiple times over shared connection paths, this method requiring a very high bandwidth.

A more advantageous possibility is offered by multicast (group call) transmission. Here, the different subscribers to whom the same message is to be transmitted are combined into a multicast group, and the multicast group is assigned an address which is specifically known as a multicast address. The data which must be transmitted is only sent once to this multicast address accordingly. In an ideal case, the multicast message is sent only once over shared connection paths from the sender to the recipients. It is not necessary for the sender to know where and how many recipients are hiding behind the multicast address.

In the case of broadcast (collective call), messages are sent to all subscribers within a geographical area. Such an area can be specified as a part of the overall network, for example. As in the case of multicast, the broadcast message is ideally sent only once over shared connection paths from the sender to the recipients. Each subscriber must implement enabling settings at the local terminal if the subscriber wishes subsequently to analyze broadcast packets from a corresponding broadcast group. In this way, individual subscribers can specify whether they wish to receive or discard all broadcast messages, or whether they wish to receive specific messages only.

As part of a known method for data communication, a specific quantity of frames is typically always exchanged between a network and a mobile radio device within a specific time. In this case, a frame is a time-relative structure, upon which in a UMTS (Universal Mobile Telecommunications System), for example, the entire signal processing and data transmission is based, see [2].

If all these frames are continuously transmitted and received by the mobile radio device, this is known as continuous transmission or continuous reception. However, it is also possible during the transmission to use an interrupted (discontinuous) reception, namely Discontinuous Reception DRX, in order to reduce the energy requirements of the mobile radio devices, for example. When using DRX, the frames are not continuously transmitted and received by the mobile radio devices, but specific frames are omitted. In this mode, however, at least a specific subset of all frames or a subset of the possible frames must be transmitted in order to maintain the connection.

In the context of transmitting messages or data to various subscribers, it is now also conceivable to provide for a transmission of messages having multimedia content. A problem may arise here, however, in that not all data types of transmitted multimedia messages can be processed by every subscriber device. In this case, it is then possible for a subscriber device to use resources and energy for receiving specific multimedia messages containing audio and video data, and for it then to transpire when processing the messages that the subscriber device is not designed to process or playback video data at all. In such a case, energy is wasted for no purpose and the service life of the subscriber device is reduced.

The present invention is therefore directed toward a way of providing an efficient, resource-saving, energy-saving transmission of data or messages to one or more recipients of a point-to-multipoint service.

SUMMARY OF THE INVENTION

According to a method for transmitting user data messages from a network element of a radio communication system over at least one transmission channel to one or more subscriber devices of the radio communication system, the form of the user data messages is announced via planning information before their transmission. In particular, the form in relation to the processing of the user data messages by the subscriber device or subscriber devices is announced in this context. An advantage of such a method is that the subscriber device or devices know from the announcement of the form of the user data messages, even before the user data messages are actually transmitted or received, whether such subscriber device or devices are capable of processing the user data messages in such a way that they are useful to the user of the subscriber device (displaying a picture which is contained in the user data messages, playing an audio file, etc.). As such, on the basis of the planning information, the subscriber device or devices can decide to receive only those user data messages which they are also capable of processing, thereby making it possible to save both resources and energy on the subscriber devices.

According to an embodiment, the method is implemented as a two-stage method, wherein the planning information is transmitted to the subscriber device or devices via two separate planning messages. The transmission of the user data messages is announced by a first planning message via a first separate transmission channel. More precisely, the first planning message may contain information about when or on which second separate transmission channel, of which there is at least one, second planning messages or user data messages will be transmitted. Description information, which specifies the form of the user data messages which are to be transmitted, is then transmitted via the announced second separate transmission channel, of which there is at least one, by the second planning message.

According to a further embodiment, the form of the user data messages which are to be transmitted may include the data type as well as the coding of the user data messages. In this case, the data type can be a text, image, audio or video format, etc. The coding may include an MP3 (Moving Pictures Experts Group Layer-3 Audio) format, AMR (Adaptive Multi-Rate) format, WAV (Windows Wave) format, JPEG (Joint Photographic Experts Group) format or an MPEG4 (Motion Picture Experts Group 4) format. It is also possible for the description information relating to the uncoded or coded user data messages to further include parameters which refer to, for example, the data volume, the image dimensions in the case of image and/or video data, or the playback duration in the case of audio and/or video data.

According to a further advantageous configuration, the method for transmitting user data, particularly in the two-stage configuration, can be carried out in the framework of a broadcast service, in particular as an extension of a Cell Broadcast Service (CMS) or a multicast service. In this context, the method is used as an extension of a Cell Broadcast Service, as specified in UMTS, which would require the radio communication system to be operated in accordance with the UMTS standard.

As mentioned above, the subscriber device or subscriber devices can analyze the planning information, particularly the second planning message or the description information which is contained therein relating to the user data messages that have to be transmitted, and therefore may receive or monitor from the second transmission channel, of which there is at least one, only those user data messages which it is, or they are, designed to process. In this way, the processing effort and, therefore, the energy consumption in a subscriber device is restricted.

According to another embodiment, a mobile radio device, in particular a mobile phone, is used as a subscriber device.

According to a further embodiment of the present invention, a subscriber device is produced for a radio communication system, with the subscriber device being designed in such a way that it can be operated in accordance with one of the methods described above.

According to yet another embodiment of the present invention, a radio communication system is produced for carrying out one of the methods described above.

Additional features and advantages of the present invention are described in, and will be apparent from, the following Detailed Description of the Invention and the Figures.

BRIEF DESCRIPTION OF THE FIGURES

FIG. 3 shows an assignment of frames to a logical channel CTCH, via which the transmission of Cell Broadcast Messages takes place.

FIG. 4 shows an index table, as used for a Cell Broadcast Service (CBS) in Discontinuous Reception (DRX) mode, for the purpose of allocating an index to the quantities or sets of resources or frames.

FIG. 5 shows a schematic illustration of the components of a conventional BMC planning message or second planning message.

FIG. 6 shows a schematic illustration of the components of a BMC planning message or second planning message, which is extended in accordance with a preferred embodiment of the present invention.

DETAILED DESCRIPTION OF THE INVENTION

Figure 1:
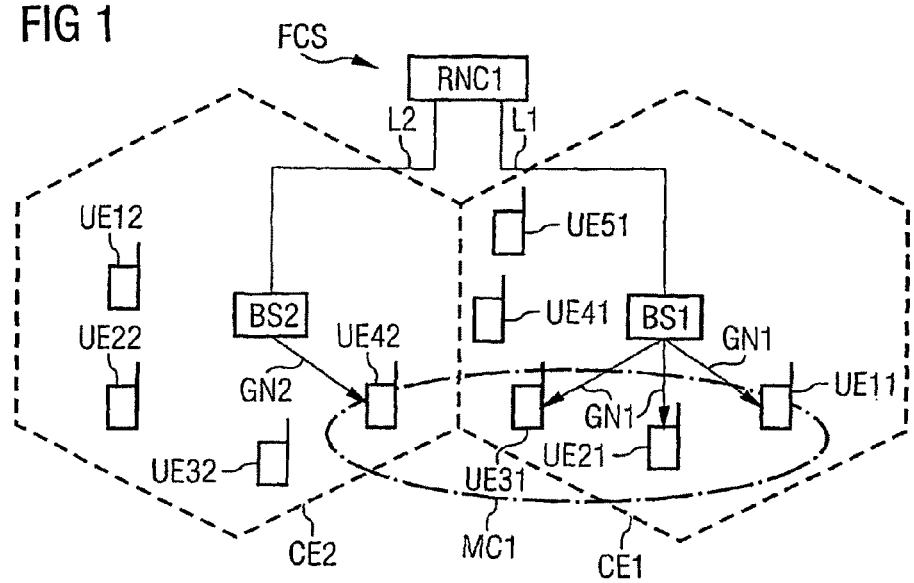
FIG. 1 shows a schematic illustration of components of a radio communication system for notifying a group of one or more subscriber device.

FIG. 1 shows an exemplary schematic illustration of two radio cells CE1, CE2 of a radio communication system FCS which is operated, in particular, according to the UMTS (Universal Mobile Telecommunications System) standard. In terms of radio functionality, the radio cell CE1 is covered by the base station BS1 in this case, while the second radio cell CE2 is supplied by the base station BS2. These two base stations BS1, BS2 are representative of a multiplicity of further base stations of the radio communication system FCS, which further base stations are not illustrated in FIG. 1 but include and cover the corresponding radio cells. The relevant base station is preferably formed by at least one radio transmitter and at least one radio receiver. It preferably has at least one transmitter antenna. In addition to or independently of its function of providing a radio connection to subscriber devices of the radio communication system FCS, the relevant base station can be responsible for the transmission in each case of data/messages to a fixed message/data network that may be present.

Within the radio communication system FCS, message/ data signals are transmitted via at least one predefined radio interface between at least one subscriber device, particularly a mobile radio device (e.g., a mobile phone) and at least one base station, preferably in accordance with a Time Division Multiple Access transmission method. It is preferably developed as a mobile radio system according to the UMTS standard. In particular, it is operated in so-called FDD mode (FDD: Frequency Division Duplex). In FDD mode, a separate signal transmission is achieved in up-link and down-link directions (up-link=signal transmission from the mobile radio device to the relevant base station; down-link=signal transmission from the relevant assigned base station to the mobile radio device) by a corresponding separate assignment of frequencies or frequency ranges. A number of subscribers in the same radio cell are preferably separated by orthogonal codes, particularly in accordance with the so-called CDMA method (CDMA: Code Division Multiple Access).

Subscriber devices preferably take the form of mobile radio device; e.g., mobile radio telephones and in particular, mobile phones. However, components of the radio communication network also may include subscriber devices in the form of other message and/or data transmission devices (e.g., internet-compatible terminals, computers, televisions, notebooks, fax devices, etc.) having an assigned radio unit for communication traffic "on air," i.e., at least one radio interface. The subscriber devices are often mobile or portable in this case (i.e., are used at different locations in the radio network), but also may be permanently configured at a location if required.

In FIG. 1, the two base stations BS1, BS2 are controlled or monitored by a supervisory radio network controller RNC1 via associated data lines L1, L2. Such controller monitors the assignment of radio resources in the radio cells CE1, CE2 of the base stations BS1, BS2. In the present exemplary embodiment, a multiplicity of subscriber devices UE11 to UE51 are located in the radio cell CE1 of the base station BS1. Likewise, a number of subscriber devices UE12 to UE42 are currently present in the second radio cell CE2 of the base station BS2. The subscriber devices UE1, UE21, UE31 in the first radio cell CE1 and the subscriber device UE42 in the second radio cell CE2 are assigned in advance to a predefinable group MC1, for which the receipt of one or more group messages must be enabled in the most efficient way possible.

Within the framework of the present invention, the term "group of subscriber devices" is preferably understood to refer to a classification according to technical service; i.e., particularly a division according to those subscriber devices which allow a multicast transmission or a broadcast transmission, for example. Furthermore, the subscriber devices in the radio cells of the radio communication network also may be sorted or divided according to a multiplicity of other criteria, particularly group message type, such as sport messages, weather forecasts, etc., or reason for occurrence, for example.

In the case of many services and applications which are offered in modern mobile radio systems, it is particularly desirable to transmit messages to not just one but to two or more mobile radio subscribers. Examples of such services and applications are news groups, video conferences, video-on-demand, distributed applications, etc.

Figure 2:
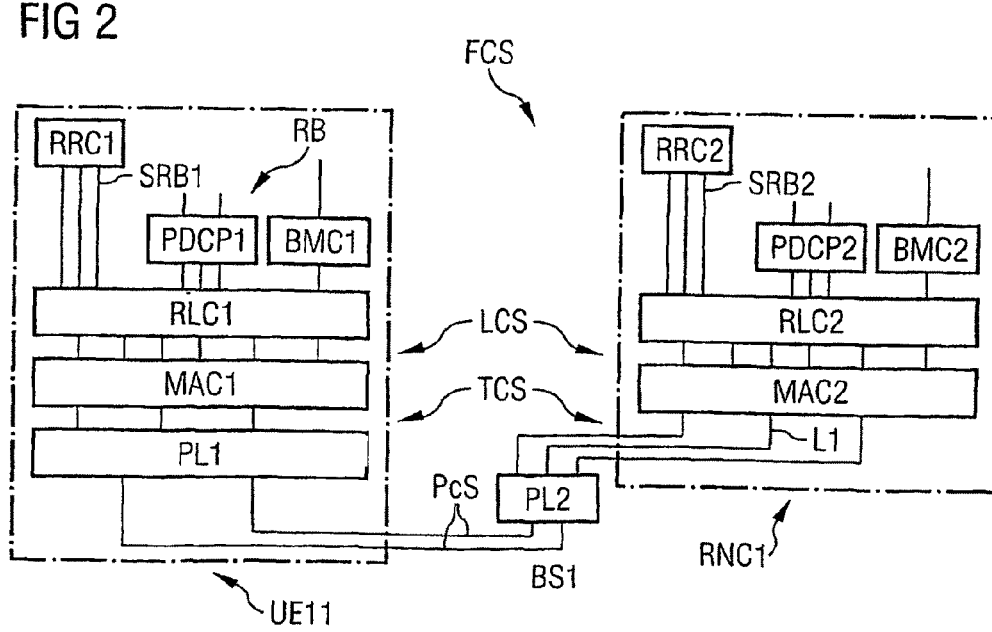
FIG. 2 shows a schematic illustration of a layered model of the protocols on the radio interface between a subscriber device and the responsible base station in the radio cell of the subscriber device in the radio communication system according to FIG. 1, particularly according to the UMTS standard.

The protocol stack or layered model of the protocols on the radio interface in UMTS is illustrated in FIG. 2, by way of example, for the subscriber device UE11 in the radio cell CE1 of the base station BS1. The mobile radio station UE11 has a physical layer PL1, which is responsible on the sending side for processing the data for transmission via the radio interface via physical channels PCS, and on the receiving side forwards the received data to the Medium Access Control layer MAC1 (MAC=Medium Access Control), which exists above it, in such a way that it can be further processed by such layer. On the network side, the physical layer PL2 is situated in the base station BS1 which is connected to the radio network controller RNC1 via a fixed network connection. The connections between the physical layer and the MAC layer are called transport channels and specify how the data is transmitted (e.g., on general channels which are heard by every mobile radio device in the radio cell of the base station, or on channels which are specifically dedicated to only one specific mobile radio station). The MAC layer has tasks such as, for example, identifying the users for whom a data packet which has to be transmitted is destined if it is transmitted on general channels, and mapping logical transmission channels (LCS) to the transport channels (TCS). For this purpose, the MAC layer on the sending side adds control information such as the identity of the relevant mobile radio station, for example, to the data packets which must be transmitted, which it received from another higher layer RLC (RLC=Radio Link Control). This RLC layer is designated as RLC1 in the mobile radio station UE11, and has the reference sign RLC2 in the base station BS1. In this case, the connections between the relevant MAC layer (e.g., MAC1 in the subscriber device UE11 and MAC2 in the radio network controller RNC1) and the relevant associated Radio Link Control layer RLC1 or RLC2 are designated as logical channels. In order to map the logical transmission channels onto the transport channels, the relevant MAC layer on the sending side adds control information such as the identity of the relevant mobile radio station, for example, to the data packets which must be transmitted and which it received from the relevant higher RLC layer. On the receiving side, such control information is analyzed and removed from the data packets again, and the data packets are then forwarded to the RLC layer via the logical connections.

The relevant RLC layer RLC1 or RLC2 is responsible, in each case, for monitoring the data transmission; i.e., for detecting missing data packets and requesting these again if necessary. A number of units can be defined in the RLC layer. In this case, each RLC unit has at least one connection between higher layers and RLC layer (e.g., Radio Bearer RB). The RLC layer on the sending side is also able to add control information to the packets which it receives from higher layers. This control information is used on the receiving side to assess whether packets are missing, for example. The control information is removed from the packets before they are forwarded again to the higher layers. Above the RLC layer is the Radio Resource Control layer RRC. In detail, this is designated as RRC1 in the subscriber device UE11 and as RRC2 in the assigned radio network controller RNC1. The relevant RRC layer is responsible for the configuration of the layers below it and, above all, for the connection setup. The connections between the relevant RLC layer and the RRC layer are called SRBs (Signaling Radio Bearers) and are designated as RRC1 for the subscriber device UE11 and as SRB2 for the radio network controller RNC1.

The so-called RBs (Radio Bearers) are also situated above the relevant RLC layer, and are used for the actual data transmission, and represent the connection between the RLC layer and the application above it. If packet data is transmitted, the so-called Packet Data Convergence layer (PDCP=Packet Data Convergence Protocol) also exists above the relevant RLC layer (e.g., PDCP1 for the subscriber device UE11 and PDCP2 for the radio network controller RNC1 in this case) and is responsible, for example for the compression of IP (Internet Protocol) packets. Also situated above the RLC layer of the subscriber device UE11 and the radio network controller RNC1 of the base station BS1 in each case is the so-called Broadband Multicast Control layer BMC1 or BMC2, respectively (BMC=Broadband Multicast Controller), which is used for receiving any Cell Broadcast messages (CBS messages). As for the RLC layer, a number of BMC units can be defined in the BMC layer concerned.

In summary, therefore, it can be stated that the transmission via the radio interface is implemented via so-called physical channels. The transmission services of the bit transmission layer or the physical layer are performed via the transport channels at the service access points. Transport channels are characterized by the way in which the data is transmitted. The transmission services of the control layer or MAC layer are performed via the logical channels. Logical channels are characterized by the type of data that is transmitted. In this case, a distinction is made between control data and traffic data or user data.

Reference is made below to different logical channels and transport channels, which are explained briefly here.

CBS messages are transmitted between RLC and MAC via a logical channel having the designation Common Traffic Channel CTCH. The CTCH is used for transmitting data of the user level to all subscriber terminals UEs (in particular UE11) or to a group of UEs. The CTCH is a unidirectional point-to-multipoint channel in the down-link section, the channel being mapped onto a transport channel or Forward Access Channel FACH. The FACH is a shared transport channel on the down-link section, the channel being used for transmitting relatively small quantities of data. The FACH is mapped onto a physical channel or radio channel accordingly, the channel having the designation Secondary Common Control Physical Channel (S-CCPCH). The S-CCPCH essentially carries information of the FACH and of one or more Paging Channels PCH. A physical channel or radio channel Primary Common Control Physical Channel (P-CCPCH) transmits the information of the BCH.

The logical channel Broadcast Control Channel BCCH is a shared channel of the down-link section, with control data being broadcast on the channel to all UEs in a radio cell. This control data includes, for example, the System Information Blocks (SIB). The BCCH is either mapped onto the FACH or onto the Broadcast Channel BCH.

A transmission of data with interrupted or so-called Discontinuous Reception DRX has already been described at the beginning as a known measure for, for example, reducing the energy requirements of the mobile radio device. DRX is used inter alia for the Cell Broadcast Service CBS which is specified in the UMTS. The system-internal planning for this, if frames or resources are available for CBS services and if these resources transport CBS messages, is made public by so-called scheduling information or planning messages. This planning is implemented in two stages.

The first stage of the planning (CB DRX Level 1) is to signal (within the first planning message or CB DRX Level 1 message) which transmission channel or which FACH (as at least one second separate transmission channel) is used and when messages are transmitted on such channel; i.e., which resources of the FACH or which frames of the S-CCPCH are actually reserved or assigned for the transmission of "Cell Broadcast" messages. This signaling should be transmitted to the RRC (RRC1) as part of the system information or system information messages via the cell-specific and logical channel BCCH (as first separate transmission channel). More precisely, information elements (IE) relating to this are defined and sent within the system information messages on the BCCH. The first planning message includes a notification of how many frames, and when frames, are assigned for the transmission of Cell Broadcast messages. CBS messages then may be transmitted in these frames only.

The illustration in FIG. 3 shows an example of the assignment of frames to the logical channel CTCH, via which the transmission of Cell Broadcast messages takes place. An offset of two frames to Frame Number 0, a periodicity of six frames for the allocated resources, and a quantity of two consecutive frames are assumed. Now a mobile terminal UE which wants to receive CBS messages no longer has to check every frame, but only the content of the frames having the numbers 2/3, 8/9, 14/15, etc. The processing effort within the UE is consequently reduced, thereby also reducing the energy requirements within it.

For CBS DRX, provision is made for the use of an index table in which an index is allocated to the sets of resources or frames, as shown by the illustration in FIG. 4. It is then very easy to coordinate the assignment of the resources in the subsequent second stage of the planning or the second planning message via such index.

For the second stage of the planning (CBS DRX Level 2), a so-called "Inband Scheduling" message (inband planning message) or second planning message is transmitted together with the actual Cell Broadcast message on the logical channel CTCH and analyzed by the BMC (BMC1). Various information is communicated to the UEs (UE11) in this second planning message or CBS DRX Level 2 message, indicating, for example, which of the CBS messages, i.e., that is the actual user data messages, include which topics or contents (e.g. weather information) and whether these messages or the information contained therein have changed since the last transmission. In this way, the terminal (UE11) only receives CBS messages if either useful information which was not previously received is transmitted or DRX Level 2 information is transmitted once again. The Broadcast/Multicast Control (BMC, in FIG. 2: BMC1 and BMC2) protocol [1] of the UMTS protocol stack is responsible for implementing the second DRX stage or the second planning message, wherein the messages which are sent by the protocol also may be designated as "BMC" planning messages (BMC schedule messages).

In the second stage of the planning, the transmission time is divided into so-called time periods or DRX periods, and information about the CBS messages (user data messages) which are sent in the period is communicated [1] by the BMC planning messages or second planning messages at least once for each period. An example of a BMC planning message is illustrated in FIG. 5. In addition to the "M-Type" information element for characterizing the message (i.e. indicating that it is a planning message and not a user data message, for example) and an "Off" information element relating to an offset for the first frame which is used for the transmission of CBS messages in the DRX period, this BMC planning message contains a "Len" information element relating to the length of the DRX period. The BMC planning message also includes a bitmap field "BitMap" which is shown here as an exemplary field having 7 bits and indicates by the setting of a bit, for each CBS message which is transmitted in the following DRX period, whether the message is new or was already transmitted. The BMC planning message also contains a list of message descriptions "M-Des," of which one in the list is present for each CBS message (user data message) in the following DRX period and features a message description type "MD-Type" which indicates, for example, whether the message is a repetition within the same DRX period or a new message and, depending on the MD-Type, a message identification "M-ID" for new messages, which specifies the content of the message (e.g., weather information), or a reference to the first send time-point of the message in the case of repeated messages. It should be noted that arrows in FIGS. 5 and 6 indicate a detailed description of an information element of a message.

When transmitting CBS messages or user data messages in the CBS, the CBS being specified in UMTS (see description above) or GSM (GSM: Global System for Mobile Communication), it is additionally possible to provide for a transmission of messages having multimedia contents. Such a service can be designated generally as a "Multimedia Broadcast Service" (MBS). In order to prevent a specific subscriber device from attempting to receive or process user data messages whose content it can actually make useable (e.g. in the form of displays on a display of the subscriber device in the case of a transmitted color image, or playback in the case of an acoustic audio file), the following principle is proposed in accordance with an embodiment of the present invention. Taking as a starting point the method as illustrated above for Discontinuous Reception of messages (DRX), an information or description information should be transmitted in the first and/or the second planning message, but preferably in the second planning message, indicating in which form or type the possibly coded user data is present in the user data messages which are to be transmitted and, therefore, which capabilities a subscriber device must have in order to decode such data or make it usable for the user of the subscriber device (playback, display, etc.).

An advantage of the additionally transmitted description information is that a subscriber device limits the received user data messages not only to those messages which it has not yet received and whose content is of interest to the user of the subscriber device, but also to those messages which it is able to process and make usable for the user as a result of its device attributes or capabilities. A method for Discontinuous Reception (DRX) is therefore extended in such a way that a terminal also saves reception energy by not receiving user data messages which it cannot decode or, for example, cannot display or playback. As such, on the basis of a description information in a (first and/or second) planning message, if a subscriber device detects that it cannot process the user data which is contained in a user data message, the corresponding user data messages are not read or monitored from the announced transmission channel, thereby resulting in a reduction in the signal processing effort and in the energy requirements.

With reference to FIG. 6, the following explains a preferred embodiment of the present invention of a method for Discontinuous Reception (DRX) within the framework of, or as an extension to, to the Cell Broadcast Service which has been specified in relation to UMTS. Since the first stage of the Discontinuous Reception (DRX) is not changed in this case, only the second stage relating to the second planning message is described below.

Corresponding with the second planning message or BMC planning message which is illustrated in FIG. 5, the message being as specified in UMTS, the second planning message as illustrated in FIG. 6 also contains inter alia the following information for each CBS message or user data message which is sent in the subsequent DRX period on the transmission channel that is used for CBS:

- message is new or old ("BitMap");
- message should/must/need not be read ("MD-Type"); and
- message identification which specifies the content of the message, such as weather information ("M-ID").

The BMC planning message is now extended further to include a set of information elements (also designated as MCD: "Message Contents Description") for each CBS message or MBS message (user data message) in the subsequent DRX period, wherein the set of information elements contains the following information. As shown in FIG. 6, in accordance with the advantageous configuration which is illustrated there, a relevant information field "M-Des(1, etc.)" was extended in this case to include an information field "MCD" which has the following information element:

- type of data or data type, such as audio, video, text or image data (provided in the information element "Contents-Type" or abbreviated as "C-Type" in FIG. 6);
- any parameters relating to the uncoded data, such as for images: dimensions in pixels horizontal/vertical (provided in the information element "C-Raw" in FIG. 6);
- type of coding, such as for audio: none, MP3, AMR, WAV (provided in the information element "C-Cod" in FIG. 6);
- any parameters relating to the coding (if required, depending on the coding) (provided in the information element "C-Param" in FIG. 6).

It is noted that, instead of being assigned to the new information field "MCD," the information elements "C-Type," "C-Raw," "C-Cod," and "C-Param" also may be assigned to another information field such as the information field "MD-Type" for the purpose of extending its information.

In the method of the second stage of the Discontinuous Reception, a BMC planning message of the type which is illustrated in FIG. 6 is now transmitted to the subscriber devices via a suitable transmission channel as per the prior art. The subscriber devices which are able to receive CBS messages receive the BMC planning message, evaluate it, and initially decide in the conventional way which messages or contents or topics (e.g., weather news) are possible for reception.

From these messages, in accordance with a preferred embodiment of the present invention, are then filtered out those which a subscriber device is not able to analyze, decode or make usable for the user as a result of its nature or capabilities (e.g., display size, decoding software, memory possibilities).

It is therefore possible that a user of a subscriber device firstly chooses which message contents the user would like to receive, and then possibly selects which data type of user data is permitted or which coding is permitted for reception (e.g., uncoded text data only, in order to consume a minimum of energy and time for processing). The subscriber device may then allow for the wishes of the user and only receive or select those user data messages for which it is designed (i.e., for which it has been configured by the user and, moreover possibly those which it is actually able to process. A message transmission which is both efficient and optimized in terms of energy consumption is therefore guaranteed.

Finally, the following example is given for the preferred embodiment of the present invention which is explained above. It is assumed that a subscriber device (such as a mobile phone) has an integrated MP3 player (e.g., as special software) and a display with a resolution of 50×50 pixels, but no video player (e.g., as special software). The subscriber device has been configured by the user in such a way that it will receive CBS or MBS messages which contain audio sequences, text and images, but not those containing the video sequences.

It is also assumed in this example that the user has effected settings for messages having an exemplary message ID of 4096.

It is now assumed that a CBS planning period includes three CBS or MBS messages having the message ID 4096, the messages being new and being received or read from a conventional subscriber device. The data in the messages is of the following type:

- Message 1: type—audio ("C-Type"), length=10 seconds ("C-Raw"), coding=MP3 ("C-Cod");
- Message 2: type—video ("C-Type"), resolution=50×50 and length=10 seconds ("C-Raw"), coding=MPEG4 ("C-Cod");
- Message 3: type—image ("C-Type"), resolution=150×100 ("C-Raw"), coding=JPEC ("C-Cod").

In accordance with an embodiment of the present invention, a subscriber device decides, on the basis of its capabilities, that Message I will be received so that it can be played if the user wishes to do so. It is also decided not to receive Message 2 since video data cannot be displayed. Message 3 is only received if the terminal offers a possibility for scrolling larger images on the smaller display or for showing the image in a reduced size.

It is noted that the principles as described above (in relation to the introduction of a planning information which specifies the form, that is data type and/or coding, of the user data messages which must be transmitted) of the method for the Discontinuous Reception (DRX) of user data messages in relation to a Cell Broadcast Service also may be applied to a method for the Discontinuous Reception (DRX) of user data messages in relation to multicast (MC) or a multicast service; in particular, in the UMTS.

Such a method including use of a Discontinuous Reception (DRX) for multicast services is subsequently designated as MC DRX, wherein Discontinuous Reception (DRX) is as described above.

In a manner which is comparable to the CBS, corresponding messages announce the planning for MC DRX, which resources are available for MC services, and when these resources transport multicast messages. For this purpose, the messages for the planning and assignment of the resources contain inter alia information about the multicast groups. In an embodiment, the multicast groups are indexed via an MC address or an MC group identity.

So-called "Scheduling Messages" or planning messages, in turn, announce the planning for MC DRX, on which transmission channels, that is physical channels or transport channels, when frames or resources are available for MC services, and when these resources transport multicast messages. The various UMTS protocol layers are configured by the radio resource controller RRC on the basis of these planning messages. Therefore, the physical level is already aware of the resources in which an MC message or further planning messages can be expected at all. Moreover, by analyzing further information, the BMC layer can decide which MC messages actually should be received. Like the CBS, the planning is implemented in two stages as described below.

The first stage of the planning, MC DRX Level 1, signals which physical channels and transport channels are used for the transmission of planning information when preparing the transmission of an MC message. Unlike the CBS, the CTCH for MC services optionally is also mapped onto transport channels other than the FACH and onto physical channels other than the S_CCPCH. Moreover, the MC DRX Level 1 message or first planning message also contains information elements indicating which frames of the physical channels are reserved or assigned for the transmission of further planning information.

Such signaling is transmitted to the RRC via the logical channel BCCH as part of the system information. Within the MC DRX Level 1 message, it is therefore stated where, how many, and particularly when resources are assigned for the transmission of multicast (MC messages (user data messages). MC messages then may be transmitted in these frames only.

An index table corresponding to that in FIGS. 3 and 4 again may be used for MC DRX, allocating indices to the sets of resources in combination with the used physical channels and transport channels. Consequently, the assignment of resources in the subsequent second stage of the planning is made very easy by these indices.

For the second stage of the planning, MC DRX Level 2, a so-called "Inband Scheduling Message" or second planning message together with the actual MC message is again transmitted and analyzed by the BMC. Various information corresponding to FIGS. 5 and 6 in relation to the CBS is transferred to the subscriber terminals (UE11, UE21, etc.) in this MC DRX Level 2 message.

In case the existing DRX for CBS is extended by the functionality for supporting MC DRX, an information element is introduced into the second planning message and is used to distinguish whether the reserved resources are resources for broadcast or multicast services. The information field "Message Type" or "M-Type" can be used, for example, to distinguish between a CBS message, MC message, planning message, etc.

In order to implement a method for user data transmission in the MC DRX according to an embodiment of the present invention, it is important to introduce an information element relating to the form of the user data message into one of the two planning messages and particularly into the second planning message; e.g., in the manner which has been described with reference to FIG. 6 using the information elements "C-type," "C-Raw," "C-Cod" and "C-Param."

A summary of background information, inter alia about the protocols used in the present application, can be found in the following sources:

[1] 3GPP TS 25.324 V3.4.0, Broadcast/Multicast Control BMC, Release 1999.

[2] 3GPP 25.211, Physical Channels and mapping or transport channels onto physical channels, Release 99.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmitting user data messages from a network element of a radio communication system over at least one transmission channel to at least one subscriber device of the radio communication system, the method comprising:
the network element transmitting at least one planning message to the at least one subscriber device to announce the form of the user data messages to be transmitted via one or more transmission channels subsequently to and separately from the at least one planning message; wherein the form of the user data messages announced by the at least one planning message includes at least one of a type of content of the user data messages and a coding of the user data messages, and
at least one subscriber device analyzing the form of the user data messages announced by the at least one planning message transmitted from the network element to determine whether or not that subscriber device is technically capable of processing the user data messages, and based on the analysis of the form of the user data messages announced by the at least one planning message, selecting whether or not to receive the user data messages at that subscriber device,
wherein selecting to receive the user data messages at the subscriber device comprises the subscriber device reading or monitoring the user data messages from the one or more transmission channels in which the user data messages are transmitted, and selecting not to receive the user data messages at the subscriber device comprises the subscriber device neither reading nor monitoring the user data messages from the one or more transmission channels in which the user data messages are transmitted.

2. A method for transmitting a user data messages as claimed in claim 1, wherein the at least one planning message includes a first planning message by which the transmission of the user data messages is announced via a first separate transmission channel, and a second planning message by which description information specifying the form of the user data messages to be transmitted is transmitted via at least one second separate transmission channel.

3. A method for transmitting user data messages as claimed in claim 1, wherein the type of content of the user data messages includes one of a text format, an image format, an audio format and a video format.

4. A method for transmitting user data messages as claimed in claim 1, wherein the coding includes one of an MP3 format, an AMR format, a WAV format, a JPEG format and an MPEG 4 format.

5. A method for transmitting user data messages as claimed in claim 2, wherein the description information further includes parameters referring to one of data volume, image dimensions for at least one of image data and video data, and a playback duration for at least one of audio data and video data.

6. A method for transmitting user data messages as claimed in claim 1, wherein the method is carried out in a framework of a broadcast service.

7. A method for transmitting user data messages as claimed in claim 6, wherein the broadcast service is an extension of a Cell Broadcast Service.

8. A method for transmitting user data messages as claimed in claim 6, wherein the broadcast service is a multicast service.

9. A method for transmitting user data messages as claimed in claim 1, wherein the radio communication system is operated in accordance with a UMTS standard.

10. A method for transmitting user data messages as claimed in claim 2, wherein the first planning message contains information about when and on which second separate transmission channel, of which there is at least one, at least one of second planning messages and user data messages are transmitted.

11. A method for transmitting user data messages as claimed in claim 1, wherein the at least one subscriber device receives only the user data messages which the at least one subscriber device is designed to process.

12. A method for transmitting user data messages as claimed in claim 1, wherein the subscriber device is a mobile radio device.

13. A method for transmitting user data messages as claimed in claim 12, wherein the mobile radio device is a mobile phone.

14. A method for transmitting user data messages as claimed in claim 11, wherein the at least one subscriber device receives only the user data messages which, with regard to the announced form, it is able to process.

15. A subscriber device of a radio communication system, in which user data messages are transmitted over at least one transmission channel to the subscriber device, the subscriber device comprising:
   computer instructions stored in non-transitory computer-readable storage media and executable by a processor for:
      analyzing at least one planning message transmitted from a network element to determine whether or not the subscriber device is technically capable of processing user data messages to be transmitted from the network element subsequently to and separately from the at least one planning message, the at least one planning message announcing the form of the user data messages to be subsequently transmitted, such that the analysis of at least one planning message includes analyzing the form of the subsequent user data messages announced by the at least one planning message, and
      based on the analysis of the form of the user data messages announced by the at least one planning message, selecting whether or not to receive at that subscriber device the user data messages to be subsequently transmitted from the network element,
   wherein selecting to receive the user data messages at the subscriber device comprises the subscriber device reading or monitoring the user data messages from the one or more transmission channels in which the user data messages are transmitted, and selecting not to receive the user data messages at the subscriber device comprises the subscriber device neither reading nor monitoring the user data messages from the one or more transmission channels in which the user data messages are transmitted.

16. A radio communication system, comprising:
   at least one subscriber device; and
   a network element that transmits user data messages over at least one transmission channel to the at least one subscriber device, wherein a form of the user data messages is announced by transmission of at least one planning message to announce the form of the user data messages to be transmitted via one or more transmission channels subsequently to and separately from the at least one planning message, wherein the form of the user data messages announced by the at least one planning message includes at least one of a type of content of the user data messages and a coding of the user data messages, and
   wherein at least one subscriber device analyzes the form of the user data messages announced by the at least one planning message transmitted from the network element to determine whether or not that subscriber device is technically capable of processing the user data messages, and based on the analysis of the form of the user data messages announced by the at least one planning message, selects whether or not to receive the user data messages at that subscriber device,
   wherein selecting to receive the user data messages at the subscriber device comprises the subscriber device reading or monitoring the user data messages from the one or more transmission channels in which the user data messages are transmitted, and selecting not to receive the user data messages at the subscriber device comprises the subscriber device neither reading nor monitoring the user data messages from the one or more transmission channels in which the user data messages are transmitted.

17. The method for transmitting user data messages as claimed in claim 1, allowing at least one subscriber device to save at least one of its resources and energy by deciding, on basis of the at least one planning message, to receive only those user data messages it is capable of processing.

\* \* \* \* \*